United States Patent [19]

Trampnau

[11] Patent Number: 4,695,013
[45] Date of Patent: * Sep. 22, 1987

[54] LANDING AID

[76] Inventor: Ulrich Trampnau, P.O. Box 167, 21211 Jeddah, Saudi Arabia

[ * ] Notice: The portion of the term of this patent subsequent to Jul. 9, 2002 has been disclaimed.

[21] Appl. No.: 659,358

[22] Filed: Oct. 10, 1984

[30] Foreign Application Priority Data

Oct. 17, 1983 [GB] United Kingdom ................. 8327731

[51] Int. Cl.⁴ .............................................. B64C 13/16
[52] U.S. Cl. ................................. 244/17.13; 340/946; 340/970; 244/183; 244/187; 342/63; 342/120
[58] Field of Search .................. 244/17.13, 17.11, 187, 244/183, 186; 340/946, 960, 967, 970, 963; 343/12 A, 5 HE, 7 TA; 73/178 R, 178 T, 178 H; 364/427, 433

[56] References Cited

U.S. PATENT DOCUMENTS

| 2,412,003 | 12/1946 | Neufeld ........................... 343/7 TA |
| 3,279,724 | 10/1966 | Miller ................................. 244/187 |
| 3,375,518 | 3/1968 | Mader et al. .................... 343/5 HE |
| 3,765,766 | 10/1973 | McConnell et al. ............. 244/17.11 |
| 3,979,717 | 9/1976 | Barnum et al. .................. 244/17.13 |
| 4,027,838 | 6/1977 | Barnum ............................. 340/946 |
| 4,241,346 | 12/1980 | Watson ............................ 343/12 A |
| 4,293,840 | 10/1981 | Hadari .............................. 244/17.13 |
| 4,528,564 | 7/1985 | Trampnau .......................... 340/946 |

OTHER PUBLICATIONS

Co-pending U.S. Application Serial No. 517,941. Notice of allowance has been issued.

Primary Examiner—Galen Barefoot
Attorney, Agent, or Firm—Laff, Whitesel, Conte & Saret

[57] ABSTRACT

A warning device, for a helicopter with a tail rotor and a mechanical protection device therefor, for giving during emergency power-loss landings a flare signal to the pilot to initiate flare followed by a tail/ground contact warning signal when the helicopter tail approaches too closely the ground. The warning device comprises in one embodiment a height-finder with two switchable transmitting/receiving antennas mounted at the helicopter tail to produce respectively, when switched into use, a height-finding beam backwards and obliquely downwards or forwards and obliquely downwards. Height signals obtained initially using antenna 40 are processed by computing means and initiate at a predetermined initial flare altitude a flare warning signal whereafter height signals from antenna 26 are used to determine the sink rate of the tail and in dependence upon this sink rate and the instantaneous height, a warning signal is initiated if this corresponds to a predetermined relative relationship. The higher the sink rate, the greater is the height at which the tail/ground contact warning signal is initiated and vice versa.

In a second embodiment, the height-finder uses a single beam the main axis of which extends backwards and obliquely downwards but of which the lobe pattern is broad enough such that vertical height measurement can be made with the helicopter in both the flare and pre-flare situation.

10 Claims, 7 Drawing Figures

LANDING AID

The present invention relates to a landing aid, for a helicopter with a tail rotor, for providing the pilot with signals to assist the pilot in a simulated or real auto-rotation landing to carry out and complete the flare at the correct times.

Statistics show that contact with an obstruction (very commonly with the ground) by the tail rotor of a helicopter is a major cause of helicopter accidents. The danger of this occurring is very high in actual auto-gyro or auto-rotation landings (landing with a switched-off or a defective motor), and in auto-rotation training landings.

The critical flying phase in an auto-rotation landing of a helicopter is, as is known, the so-called final flare phase, that is with the helicopter tilted with the tail extending obliquely downwards immediately before the helicopter is set on the ground. There is the danger in carrying out the final flare phase at low level that the obliquely downwardly hanging tail, and therefore the tail rotor secured to it, will touch the ground, with the result that the helicopter, which no longer has any counter moment, will turn abruptly. It is extremely difficult for the pilot to recognize when the optimal flare altitude has been reached, particularly in bad visibility. But even in perfect visibility, it is almost impossible for even experienced pilots accurately to judge the distance from the ground of the tail, which is situated several meters away from him. Adding to the difficulty is the fact that even small changes in the angle of inclination of the helicopter head to considerable changes in height at the end of a long tail, and that the rate of vertical descent is of considerable importance in determing the likelihood of contact.

If the initial and final flare phases are carried out at too high an altitude, then, after the rotors have slowed down, the helicopter sinks too rapidly and, in landing, the landing gear and backbone may be damaged. Should the pilot attempt to correct for the rapid sink rate by increasing the pitch too much, then the main rotor blades, with their low rotation energy, bend and may slice into the tail cone or even the forward cabin. Pilots are, therefore, urged in training first to "go for the ground then flare".

The risk then occurs that the flare is carried out at too low an altitude and the tail and tail rotor come into contact with the ground.

The tail rotor blades can contact the ground even though helicopters with a tail rotor have a mechanical protection device. This mechanical protection device may consist simply of an arm or bar structure which extends from the tail downwardly and then rearwardly to a level below the level of the arc described by the tips of the blade. In other cases it is formed by a bar on a tail fin. The device is intended to give specific protection in the flare situation. However, if, as is natural, the pilot has sought the softest ground, e.g. a ploughed field, the mechanical protection arm or device for the tail rotors may enter the soft ground without the pilot being aware of it and then the tail rotor will contact.

The applicant's co-pending European Patent Application No. 83 107 382.0 discloses a warning device which gives the pilot a warning signal when there is danger during the final flare phase of the tail rotor contacting the ground. This device, which incorporates a height-measuring arrangement transmitting a high frequency electromagnetic wave beam, used in the height measurements obliquely backwards and downwards, only gives the pilot a warning signal in the event of threatened contact with the ground.

The aim of the present invention is to provide a landing aid which not only provides the pilot with an indication of when to cease the final flare phase but also when to initiate the flare.

According to the present invention there is provided a landing aid, for a helicopter with a tail rotor, for assisting a pilot to carry out a simulated or real auto-rotation landing, comprising a height-measuring arrangement with transmitting and receiving means, positioned at the tail of the helicopter, for a high frequency electromagnetic wave beam the axis of which is directed backwards and obliquely downwards from the helicopter, and means for calculating the tail height from the reflected electromagnetic wave signals; and further comprising computing means for computing the tail sink rate from height measurements or reflected electromagnetic wave signal, means for providing a flare signal to tell the pilot to start the flare, and means for providing a warning signal to tell the pilot to stop the flare when the tail sink rate relative to its instantaneous height corresponds to a value indicating danger of tail/ground contact.

In one embodiment, the transmitting and receiving means comprises a landing aid according to claim 1 wherein the transmitting and receiving means comprise first means for transmitting said high frequency electromagnetic wave beam or first beam and second transmitting and receiving means for transmitting a second high frequency electromagnetic wave beam directed substantially vertically downwards and wherein the height calculation and speed computation is effected using the second beam signals prior to the giving of the flare signal and using said first beam signals after the giving of said flare signal.

Preferably in said one embodiment the height measuring arrangement and first and second transmitting and receiving means are formed by a single height determining radar equipment feeding two separate transmit/receive antennas via a switching arrangement, one transmit/receive antenna being for the first beam and the other for the second beam.

Preferably the landing aid is such that on take-off, the operative height-measuring beam is said first beam but the operative beam changes to the second beam as soon as the helicopter exceeds said predetermined initial flare altitude. This ensures that, during this take-off phase and whilst flying at low level, the tail/ground contact warning signal will be given each time if there is danger of a tail collision.

In a second embodiment of the present invention said high frequency electromagnetic wave beam is sufficiently broad to ensure that both when the helicopter is at a customary auto-rotation attitude in a descent prior to flare and when in the steepest normal flare attitude, reflected wave signals are receivable from the ground substantially vertically below the tail mounted transmitting and receiving means.

An appropriate height for generating the flare signal for the initial flare phase with, for example, a Bell 206 helicopter, may be approximately three and a half times the rotor diameter, i.e. approximately 36 meters. Preferably the flare signal is transmitted for, say, 1.0 sec.

The tail/ground contact warning signal in the final flare phase may with advantage be initiated when the rate of approach to the ground and height is such that without helicopter attitude correction, tail contact would occur in 1.5 secs. This allows the pilot about 1 second to come out of the flare.

Other height or time settings may, of course, be chosen as more appropriate from experience and, particularly, with different types of helicopter.

The landing aid according to the invention, therefore, emits tail/ground contact warning signals not at specific constant warning distances but at distances that depend on the rate of vertical descent of the tail of the helicopter. The microprocessor or computing means of the landing aid is, therefore, programmed for the specific helicopter type and so that the distances from the ground at which the tail/ground contact warning signals are released are greater the greater the rate of vertical descent of the helicopter.

The landing aid according to the invention, therefore, assists the pilot to carry out auto-rotation in training or in emergencies without danger of tail impact during the final flare phase or of starting to flare at the wrong altitude. This is so in training even in the absence of an instructor.

To enable the device to be used only in training flights or as a simple "add-on" module to existing helicopters, the device can be contained in a housing with releasable clamps for clamping the housing to the tail and in this case the device preferably includes an independent power supply and a VHF frequency transmitter or electro-optical transmitter for transmitting signals to a radio receiver or optical signal receiver in the cockpit. It can, or course, be enough for a helicopter flying school to have one or two such warning devices, which are then mounted on the helicopters with which it is desired to practice an auto-rotation landing.

For practice auto-rotation landings, the "add-on" device version should, as mentioned, have its own current supply and, therefore, operate completely independently. It is also benficial that the arrangement, particularly when using radar beams, can be kept very small and weigh only a small amount, say, about 2 kg.

For a better understanding of the present invention reference will now be made, by way of example, to the accompanying drawings in which.

Figure 1:
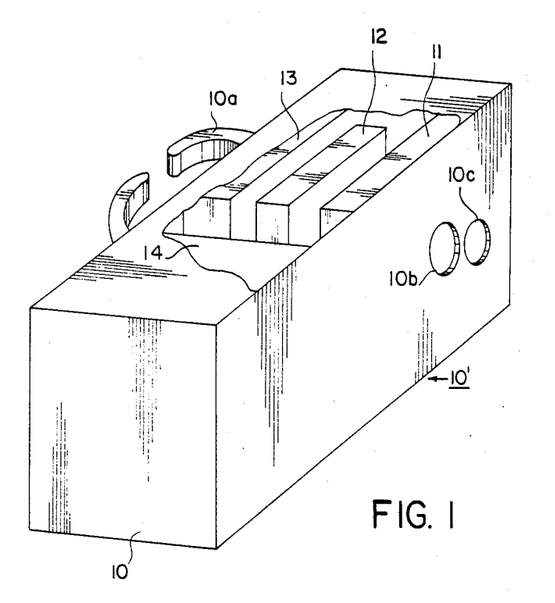
FIG. 1 shows a landing aid according to the invention, as an "add-on" module, in perspective sketch-form, one part of the housing being broken away.

As shown in FIG. 1, the "add-on" form of the landing aid 10' according to the first embodiment of the invention is housed in a protective housing 10 which has securing clamps 10a on one of its sides. There are accommodated in the housing a radar height-finder unit 11, a computer or microprocessor unit 12, a radio transmitter unit 13 and an electrical battery power supply 14. 10b and 10c denote apertures in the protective housing 10, through which the height-finder 11 emits radar beams. The signal output of the height-finder 11 is connected to the computer 12 whose output then controls the radio transmitter 13. The current supply for the devices 11, 12 and 13 is provided by the battery power supply 14.

Figure 2:
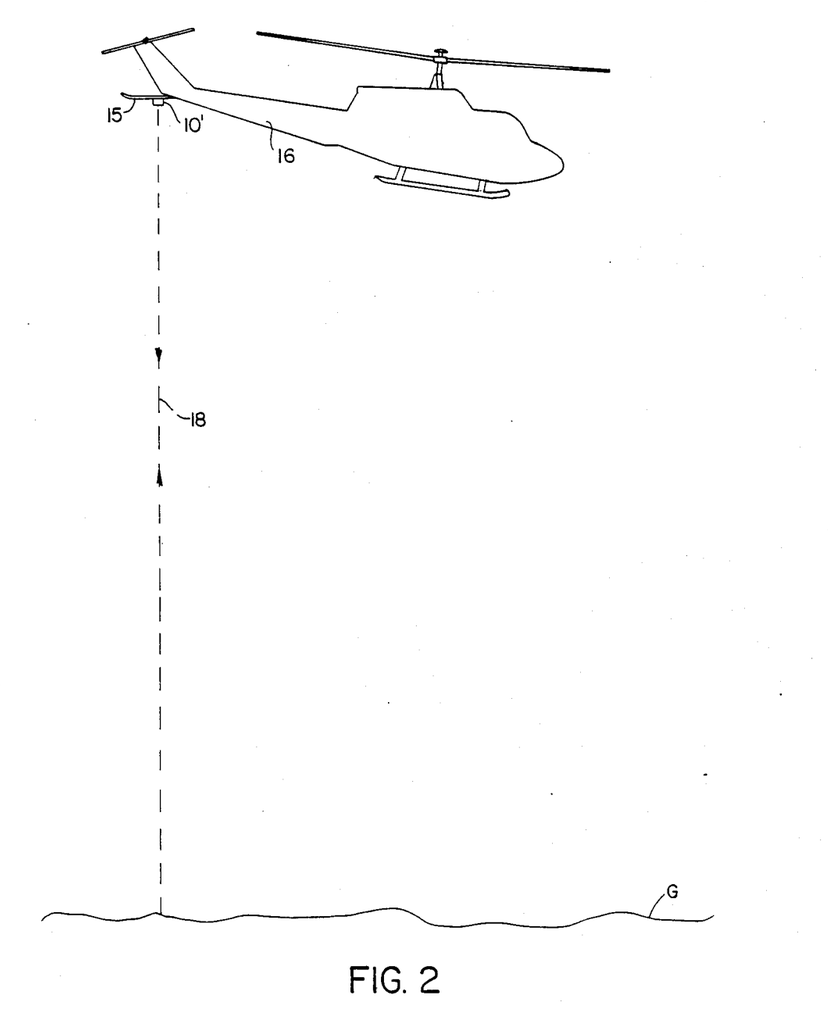
FIGS. 2 and 3 each show in diagrammatic form a helicopter with a warning device according to one embodiment of the invention mounted thereon.
Figure 3:
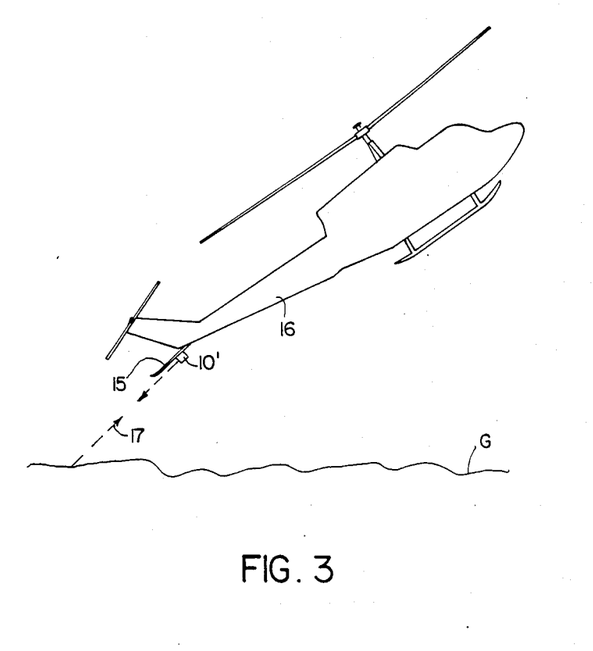

FIGS. 2 and 3 show a helicopter with a tail section 16, a mechanical tail rotor protection device 15 and a landing aid 10' according to the invention mounted on the tail rotor protection device. The landing aid could, of course, be mounted on the helicopter tail itself if more convenient. FIG. 2 shows a helicopter in an emergency loss-of-power descent prior to going into a flare attitude and FIG. 3 shows the helicopter in the flare attitude. Also shown in the drawings are first and second high frequency electromagnetic wave beams 17 and 18 respectively used in height measurement. The device 10 is mounted such that it points rearwardly and downwardly relative to the helicoptor longitudinal axis.

Figure 4:
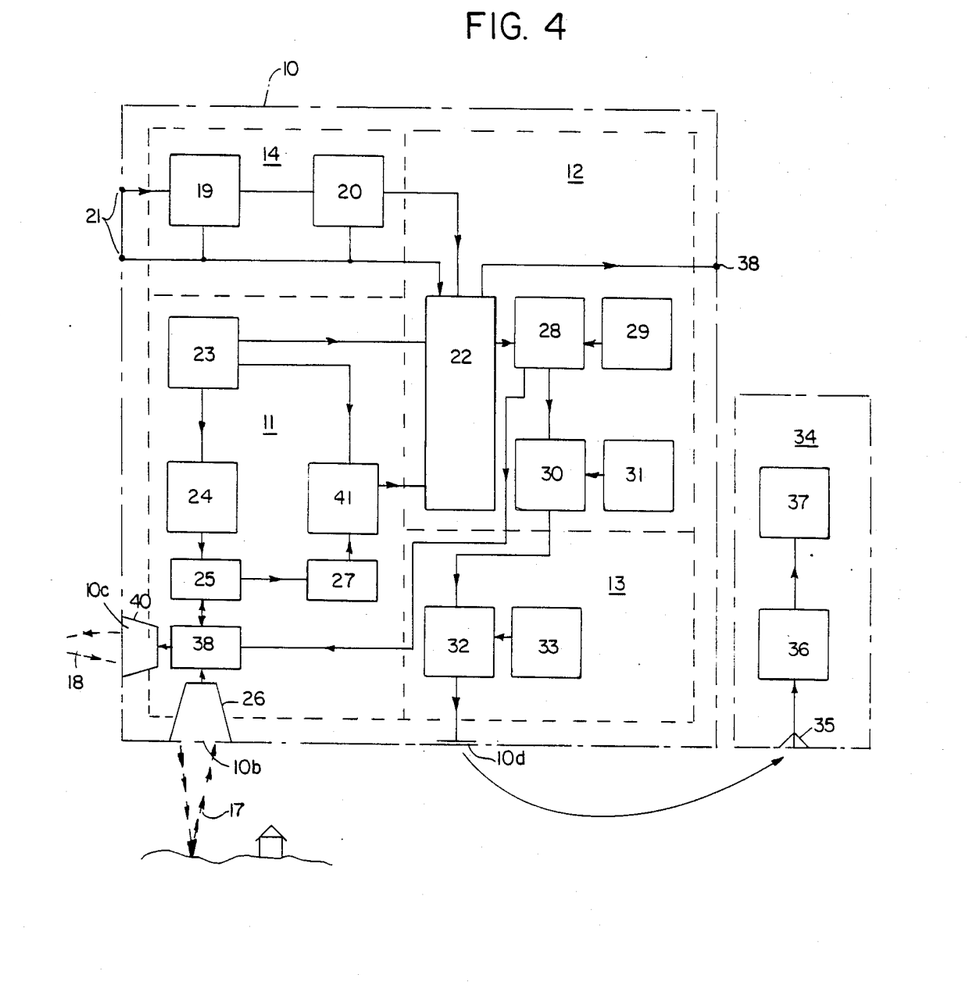
FIG. 4 shows a block circuit diagram of a warning device of this embodiment of the invention.

In FIG. 4, which shows the block circuit diagram of the landing aid, the housing 10 is represented by a dot-dash line.

As shown by dashed lines in FIG. 4, there are accommodated in the housing a radar height-finder unit 11, a computer or microprocessor unit 12, a radio transmitter unit 13 and an electrical battery power supply 14. 10b and 10c denote apertures in the protective housing 10 through which the height-finder 11 emits, as required, the appropriate radar beam 17 or 18 respectively. The signal output of the height-finder 11 is connected to the computer 12 whose output then controls the radio transmitter 13. The current supply for the devices 11, 12 and 13 is provided by the battery power supply 14.

The battery power supply comprises a battery or accumulator 19 and a power supply arrangement 20 which converts the battery output into appropriate voltages for the other circuit elements of the warning device. Battery charging and battery test signal sockets 21 are provided on the housing 10. Outputs from the power supply 20 are connected for battery testing to an interface unit 22 which forms part of the microprocessor device 12. Power is supplied for operation by means not shown from supply 14 to the units 11, 12 and 13.

The radar height-finding arrangement comprises a timing oscillator and divider unit 23 which has outputs coupled to the interface unit 22, a gate circuit 43 and a signal generator/driver unit 24. The output of the signal generator/driver unit 24 is fed to a K-band radar height-finder module 25. Different forms of module can be used either working according to the FM-CW or pulse type radar principles. The radar signal output of the module 25 passes via a switch unit 38 to either antenna 26 or antenna 40 to produce the radar height finding beam 17 or 18 respectively, and the return radar beam signals are passed via the switch unit 38 to be processed in the module 25 to give a height output signal. T-R switches (not shown) are used to isolate the transmitted and received radar signals. This height output signal of module 25 is coupled via a filter and pre-amplifier/limiter unit 27 to a gate 41 and the output from gate unit 41 is fed via the interface unit 22 to a microprocessor calculator 28.

The microprocessor unit or computing means 12 comprises in addition to the calculator unit 28 a store 29, for storing calculation constants and which is coupled to the calculator 28. One output of calculator 28 is coupled to a warning tone generator 30 which is also fed by a warning signal store 31, the parts 30 and 31 also forming part of the overall microprocessor unit 12. A second output of calculator unit 28 is fed as an input to switch unit 38.

The VHF radio transmitter unit 13 may comprise a standard flight VHF radio transmitter 32 and this unit 32 has a quarz-controlled transmitter oscillator unit 33. The output of the radio transmitter 13 is coupled to a transmitting antenna 10d.

Also shown in FIG. 4 is part of the helicopter instrumentation referenced 34. This comprises the normal radio receiving antenna 35 coupled to the standard flight radio receiver 36 the output of the is coupled to a loudspeaker or head-phones unit 37.

Finally, the housing 10 has a servicing or test socket 38 by which signals can be checked for the units via the interface 22.

The arrangement shown in FIG. 4 operates as follows:

Battery 19 provides power to the power supply unit 20 which converts the voltage of battery 19 into the appropriate voltage levels for operation and supplies these voltages via means not shown to the units 11, 12 and 13. Output from the power supply unit is also coupled to the interface unit 22 so that following a battery test input on socket 21, a battery test is performed by the microprocessor unit 12.

Upon take-off and initial switching on of the system, the computing means, via a signal from unit 28 to switch unit 38, causes the switch to direct the output of radar module 25 to antenna 26 to produce the first height-finding radar beam 17. When climbing after take-off, the helicopter reaches the predetermined initial flare altitude at which during an auto-rotation descent the initial flare warning signal is to be given, the switch unit 38 receives a signal from processor 28 to switch the output of module 25 to antenna 40 so as to produce beam 18. The main axis of beam 18 is directed substantially vertically downwardly with the helicopter axis substantially horizontal.

The radar height-finding or altimeter unit 11 operates in normal manner. Radar module 25 is supplied with a continuous wave modulation signal by means of the timing oscillator 23 and the signal generator/driver unit 24. A modulated RF radar signal is transmitted to the ground and the reflected signals are processed in module 25 to derive the instantaneous height of the helicopter tail above the surface of the ground or other obstruction in the path of the radar beam. The processed signals are fed to the filter and pre-amplifier unit 27 and the amplified height representative output signals of unit 27 are fed to the gate 41. Gate 41 is opened periodically by sampling signals from the timing oscillator 23 and the height signals are passed by the opened gate to the microprocessor calculator 28 via the interface 22. For fast response the sampling rate needs, of course, to be high.

If, after the landing aid has switched to beam 18, the helicopter approaches the initial flare altitude (e.g. 3½ times main rotor diameter), processor unit 28 sends a signal to the signal tone generator 30 to initiate therefrom a flare signal. This signal is sent sufficiently early prior to the initial flare altitude being reached such that with the normal pilot reaction time, the pilot will start the flare at the correct altitude. Microprocessor 12 calculates when to send the signal based on the sink rate etc.

The tone generator 30 transmits a flare indication signal in accordance with the flare signal stored in the store 31 to the radio transmitter 32 which transmits it via the transmission antenna 10d. This flare signal is sent for approximately 1 second. Alternatively, it can be transmitted until the helicopter has reached a height of two times the main rotor diameter. This transmitted flare signal is received over the normal VHF radio receiver 36 from the antenna 35 and will be heard by the pilot either over the loudspeaker or the head-phones 37.

If the flare signal is to be sent for a fixed time, then as soon as the signal is sent from unit 28 to initiate the flare signal, another signal is also sent from unit 28, via its other output, to switch unit 38 to cause the switch-over of the connection of the radar module 25 from antenna 40 to antenna 26. If the flare signal is to be transmitted until the height falls to two times the rotor diameter, then the signal to effect switch-over of the antennas is not sent until that height has been reached.

When in the flare, with the height-finding beam 17 being transmitted from antenna 26, the microprocessor calculator 28 calculates the sink rate of the helicopter tail using timing signals received from the unit 23 and the sampled height signals from the height-finder 11. The sink rate and the instantaneous height are compared with calculation constants from the store 29 and, if the height falls below a predetermined limit for the relevant sink rate, a warning signal is generated and fed to the warning tone generator 30. This second warning signal is transmitted over the radio transmitter in the same way as the flare signal.

The warning signal in the final flare phase indicates to the pilot that he needs to immediately come out of the final flare and level off if he is to avoid tail/ground contact. This warning signal will be transmitted at a height depending on helicopter type and sink rate and may be sent at a tail height of, say, one meter or less in some cases. The rate of sampling of the height signal by gate 43 and timing oscillator 23 may be lower at higher altitudes than at low altitudes and arrangements not shown may be provided to vary the sampling rate dependent upon the instantaneous height measurement. Obviously, the sampling rate needs to be high and the height-finder very accurate with the short times and small height differences involved.

The stores 31 and 29 may be made exchangeable so as to provide respectively for diferent types of warnings and also to provide for different calculation constants appropriate to different types of helicopters.

Similarly, the transmission oscillator 34 may be changeable to provide for the different receiving frequencies of the receiver of the different helicopters to which the unit may be fitted. If the transmitter 32 is a broad band transmitter, this will avoid the need for many otherwise necessary changes of the transmission "oscillator". This will not unduly interfere with other air traffic since it is intended that the transmission range should be small, e.g. not exceeding the 50 m range, and only sufficient to be reliably picked up by the helicopter receiver. Instead of working through the normal aircraft receiver, a separate VHF receiver could be used coupled to the pilot's head-phones and this receiver and the transmitter of the warning device would then both be tuned to the same specific narrow band frequency.

The device of FIGS. 1 to 4 can, of course, be changed in many ways. The shape of the housing 10 is, advantageously for example, of an aerodynamic design. It is advantageous if the microprocessor 12 is suitable for storing several fixed programs because it is then particularly simple to use the same device both for the auto-rotation landing in different helicopters. Although the switch-over from one antenna to the other has been shown as being controlled by the processor 28, it could, alternatively, be effected by a separate unit fed with the instantaneous height output of the radar module 25. In the latter case, an output of this separate control unit would be fed to processor 28 to inform that unit of the antenna in use so that the appropriate warning signals are initiated.

Similarly, two separate radar modules each permanently in use and each associated with a respective antenna could be used and solely the outputs therefrom selected before and after reaching the initial flare altitude.

Clearly, a warning device according to the invention can be fitted as initial permanent equipment in the original construction of a helicopter. In this case it may be preferable to mount solely the transmitting/receiving antenna of the radar height-finder at the end of the tail portion, the remainder of the equipment being mounted in the cabin section. However, since the equipment may be so small, most of it may be mounted at the tail in this original fitting version also. Obviously, the transmitter 13 may not be needed in this "initial-fit" case and the warning signal could be brought to the pilot in another way by cable or optical fibers.

Figure 5:
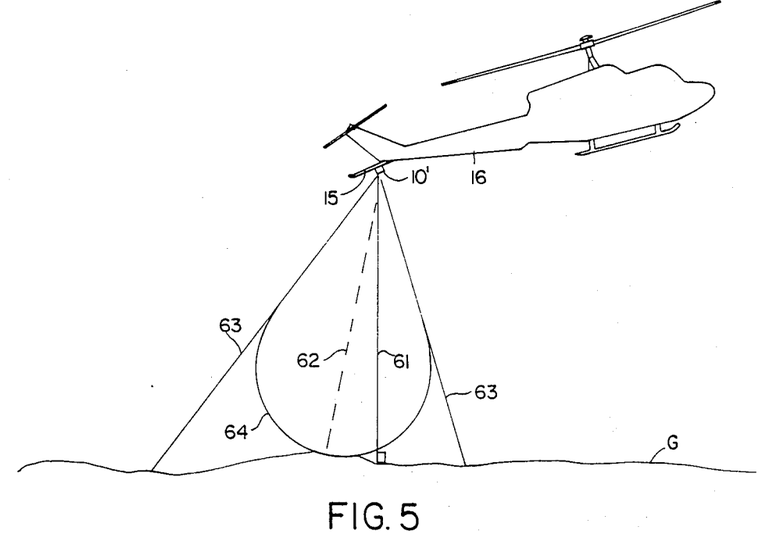
FIGS. 5 and 6 show in diagrammatic form a helicopter with a warning device, according to a second embodiment of the invention, mounted thereon.
Figure 6:
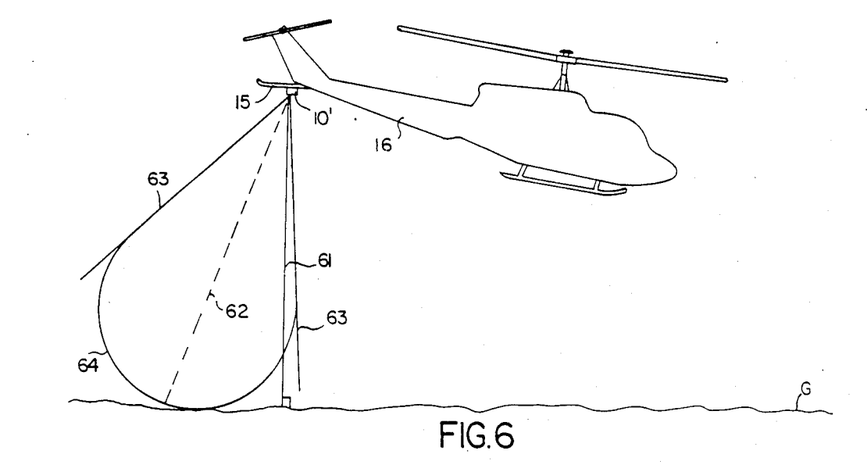
Figure 7:
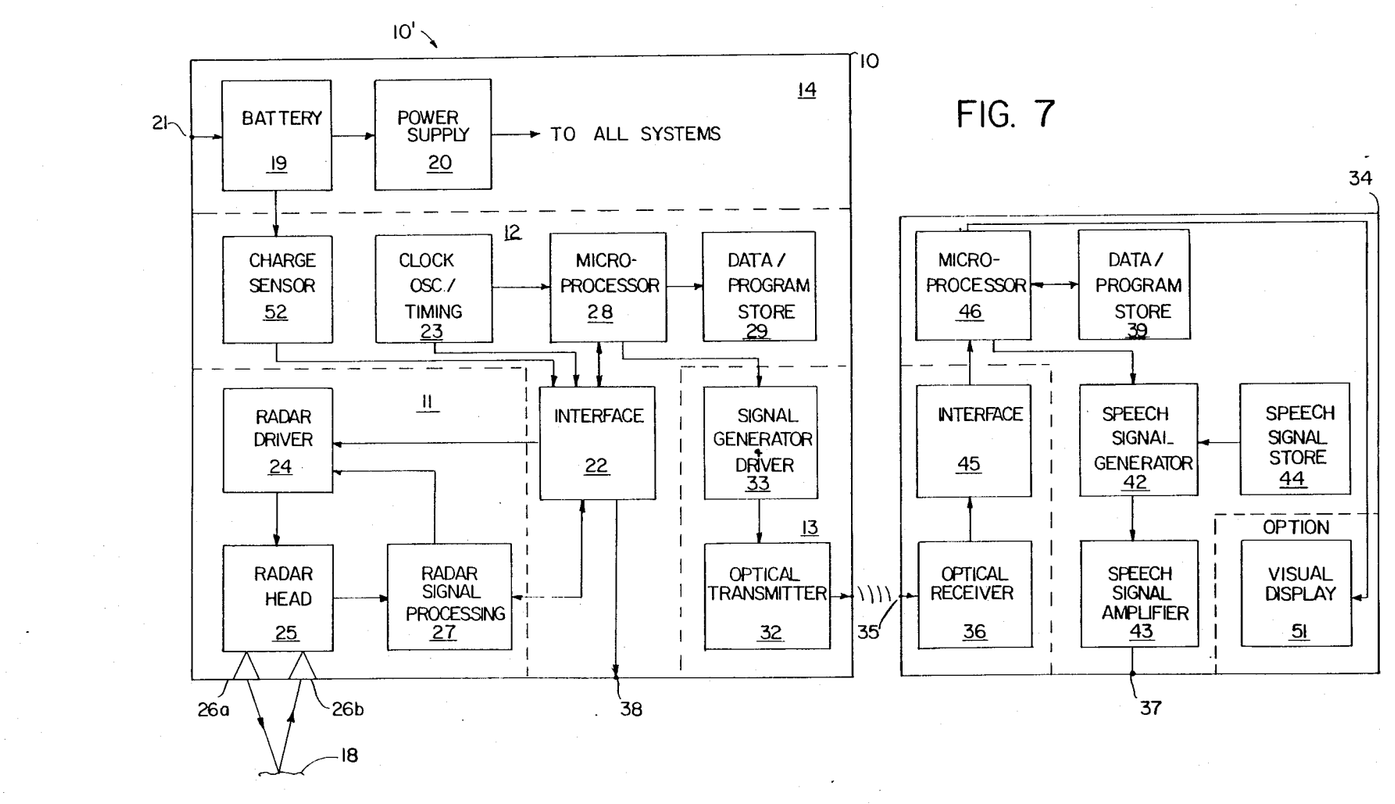
FIG. 7 shows a block circuit diagram of the second embodiment of the invention.

FIG. 5 to 7 show diagrammatically a second, preferred, embodiment of the invention. In these Figures, parts similar to parts in the landing aid of FIGS. 1 to 4 have been given the same references. This second embodiment utilizes a single radar beam with a broad radar beam lobe instead of two separate switchable radar beams as in the embodiment of FIGS. 1 to 4.

FIGS. 6 and 5 show a helicopter in a pre-flare attitude and flare attitude respectively during an auto-rotation descent although the distances from the ground are not to scale and comparatively incorrect. The spacing between the helicopter and the ground, used in the drawing is simply the spacing required to enable the radar beam characteristic pattern and direction to be drawn in clearly. The radar beam has a main axis 62 and is broad enough such that measurements of the distance vertically below the landing aid 10 can be made with the single constant main beam axis direction when the helicopter is both in the flare attitude and in the pre-flare auto-rotation attitude. In these Figures, line 61 represents the vertical line extending between the landing aid 10 and the ground and lines 63 indicate the extreme measuring limits of the shown radar beam, thelobe 64 as usual indicating simply the signal strength of signals within the beam at different angles to the beam axis. Clearly, line 61 lies between these measurement limits in both drawings and, therefore, a measurement of the vertical height of the tail from the ground may be achieved in both attitudes using a single beam without switching of the beam direction. The beam is a conical beam so that even when there is a side-ways tilt or yaw of the helicopter, a measurement of the vertical distance to the ground may be achieved since the vertical distance will still lie within the radar beam cone.

The landing aid circuit diagram for the embodiment of FIGS. 5 and 6 is given in FIG. 7. The unit 10' mounted at the tail like the circuit of FIG. 4, has an individual battery 19 which through a power supply circuit 20 feeds the necessary voltages to the different units in the housing 10. 21 again denotes a charging or test terminal but in this circuit there is also provided an additional unit 52 which is used as a state of charge sensor for the battery 19, information about the charged state being fed via interface 22 to the calculator or processor unit 28.

A warning signal can, of course, be initiated by means, not shown, activated by the processor 28 if the state of charge is insufficient to ensure correct operation of the landing aid.

In the radar height-finder section 11 of this embodiment, the radar output is fed to a separate antenna 26a from that antenna, 26b, used for reception so that a TR switch is not necessary. A radar driver unit 24 as with the circuit of FIG. 4 provides pulse or frequency modulation signals to the radar microwave head module 25. The carrier frequency of the radar is chosen to be in the K band between 26.5 and 40 GHZ, for example, a carrier frequency of 35 GHZ.

Some conventional radar height-finders also use separate transmitting and receiving antennas which are fixed and spaced apart but normally these are spaced a significant distance apart, e.g. several or more meters, the actual distance varying with radar height-finder type and/or helicopter type. In the present arrangement because of the very high frequency, and consequent short wave length of the radar signals, the spacing of the transmitting and receiving microwave antennas is intended to be very small—of the order of 15 cm or less. This together with the use of a wide bandwidth results in very much greater accuracy of the tail height measurements close to the ground than is achievable with the wide spacing employed with conventional height-finders.

With appropriate bandwidth and with this small spacing, accuracy of measurement of distances may be better than ±15 cm which is the order of accuracy required to enable accurate signalling of the flare and warning signals. Triangulation errors cause conventional radar height meters to be unsuitable for such landing aids. Signals received by antenna 26b return to the radar head module 25 and are passed to the radar signal processing unit 27 which calculates therefrom the height the sink rate of the tail section. The units 24, 25 and 27 can with advantage be designed so as effectively to track the ground, i.e. instead of always measuring through the complete range, the previously measured height is used to define the region of the signals to be examined for the expected new height return signal echo. Feedback control of the radar driver 24 by the signal processing unit 27 can thus improve the signal/noise ratio. Such types of radar system are already known.

Alternatively to determining the sink rate from the change in the height measurement signals, the sink rate may be extracted by doppler frequency measurement which, although more expensive, may be more accurate.

All the units are synchronised by signals from the clock or timing oscillator 23 which feeds its output to processor 28 and via the interface 22 to the other circuits. The processor 28 in this embodiment can be relatively simple and is used to control the radar and the transmission of signals to a cockpit unit 23 of the landing aid and prepares digital height and sink rate signals for transmission to the unit 34.

In this second embodiment of the invention, signals are transmitted from the tail mounted height-finding unit to the cockpit unit 34 by optical means instead of by a radio transmitting arrangement as in the first embodiment shown in FIG. 4. The transmitter unit 13 comprises a signal generator and driver section 33 to which the height and sink rate signals are fed from processor 28 and an electro-optical transmitter 32, e.g. an infrared LED transmitter unit. The optical signals transmitted from transmitter 32 are received by an opto-electrical receiver 36 which converts the received optical signals into electrical digital signals and feeds these signals via an interface 45 to a processor 46. This processor 46 takes over the decision-making process of the processor 28 in the embodiment of FIG. 4 to determine the height and sink rate signals that are to generate the flare and warning signals. For the purpose of generating these signals, the processor unit 46 has a store 39 containing program data and also control data relevant to the particular helicopter type. The warning and flare signals are given in sufficient time to enable the pilot to react so that the actual flare initiation and flare termination are carried out by the pilot at the correct heights. In other words, the flight changes prior to initiation of the signals are taken into account to estimate when the helicopter will reach the appropriate heights for starting and ending the flare and the signals given to the pilot in time for him to react and make the corrections as these heights are reached.

The processor 46 controls a speech signal generator 42 which feeds a speech signal amplifier 43 and from there it is connected via an output 37 to the pilot head-set. 37 may be a T-connector which is interposed in the path between the head-set and the normal radio equipment of the helicopter cockpit. 44 designates a store which stores various speech signals. The speech signal generator need not be a speech synthesizer but can simply extract appropriate digital signals from store 44 since the necessary vocabulary is limited. 51 shows an optional unit which may be used instead of or additional to the speech signal generating unit and is a visual display unit which can give visible flare and warning signals to the pilot instead of audible signals.

The complete unit 34 is contained in a housing represented by the surrounding square box referenced 34. Units 10' and 34 are designed to be readily removable and portable for training use on different helicopters. Unit 34, however, since it is to go in the cockpit can be designed to be fed from the normal on-board power supply and plugged into this supply by a cockpit power socket. Obviously, it needs to be positioned such that the optical signals can be received by the unit 36, i.e. so that the transducer 35 has an unobscured optical path to it.

Clearly again, if the equipment is to be a standard or permanent fit in a helicopter, the optical transmission units and paths can be replaced by cables and unit 10' would not need a separate battery. In this embodiment also radio transmission could be used to transmit signals from the unit in the housing 10 to unit 34. This need not be the normal VHF equipment but would in the embodiment shown in FIG. 7 be preferably a separate radio transmission path specific to the units.

As with the previous embodiment, many modifications are possible and the housing 10 would preferably be aerodynamic in shape.

Processor 46, in addition to processing the height and sink rate signals to determine the time of initiation of the flare and warning signals, can also check various elements of the system and produce warnings of breakdown, e.g. low battery charge, interruption in the optical transmission path etc.

I claim:

1. A landing aid, for a helicopter with a tail rotor, for assisting a pilot to carry out a simulated or real autorotation landing, said landing aid comprising means for giving a height-measurement by transmitting and receiving high frequency electromagnetic wave beams, positioned at a tail of a helicopter, said high frequency electromagnetic wave beam having an axis which is directed backwardly and obliquely downward from the tail of the helicopter, means for calculating the tail height responsive to a receipt of the reflected electromagnetic wave signals; computing means for computing the tail sink rate responsive to at least one of said height measurements or reflected electromagnetic wave signal, means for providing a flare signal to tell a pilot when to start a landing flare, and means for providing a warning signal to tell a pilot when to stop the landing flare responsive to the tail sink rate relative to its instantaneous height and a corresponding value indicating a danger of a tail/ground.

2. The landing aid according to claim 1 wherein the transmitting and receiving means comprise at least a first means for transmitting said high frequency electromagnetic wave beam or first and second transmitting and receiving beams, means for transmitting a second high frequency electromagnetic wave beam directed substantially vertically downwardly, and wherein the height calculation means is effected responsive to the second beam signals prior to the giving of the flare signal and responsive to said first beam signal after the giving of said flare signal.

3. The landing aid according to claim 1 wherein said high frequency electromagnetic wave beam is sufficiently broad to ensure that both when the helicopter is at a customary auto-rotation attitude in a descent prior to flare and when it is in the steepest normal flare attitude, reflected wave signals are receivable from the ground substantially vertically below the tail mounted transmitting and receiving means.

4. The landing aid according to claim 1 and means for giving the flare and warning signals to a pilot head-set via a connector interposed in a normal connection between the head-set and standard radio equipment located on said helicopter.

5. The landing aid according to claim 1 wherein said height-measuring means is in a first "add-on" module containing its own power supply in a housing with means for releasably clamping the housing to the helicopter tail; the means for generator the flare and warning signals is in a second module which is removable positioned in a cabin of said helicopter and which is connectable to the helicopter power supply; and the first module has signal transmitting means for transmitting height and speed information signals to signal receiving means for the second module.

6. The landing aid according to claim 2 wherein the height-measuring means and said means for transmitting and receiving beams are formed by a single height determining radar equipment feeding two separate transmit/receive antennas via a switching arrangement, one of said transmit/receive antennas being for the first beam and the other of said transmit/receive antennas being for the second beam.

7. The landing aid according to claim 2 and means wherein on take-off the operative height-measuring beam is said first beam, and means for changing the operative beam from the first to the second beam as soon as the helicopter exceeds a predetermined initial flare altitude.

8. The landing aid according to claim 6 wherein the signal transmitting and signal receiving means are electro-optical means.

9. The landing aid according to claim 6 wherein the signal transmitting and signal receiving means are radio devices.

10. The landing aid according to claim 3 wherein the height measuring means is a radar height-finding unit having transmitting and receiving means comprising a transmitting antenna and a receiving antenna spaced not more than about 15 cm apart, means for transmitting a radiation which has a carrier frequency between 26.5 and 40 GHz, and a band width which is such that a height measurement accuracy of better than approximately ±15 cm is obtained.

* * * * *